Feb. 8, 1927.  C. C. CALKINS  1,616,783
MACHINE FOR TREATING GRAIN
Filed Aug. 16, 1926  2 Sheets-Sheet 2
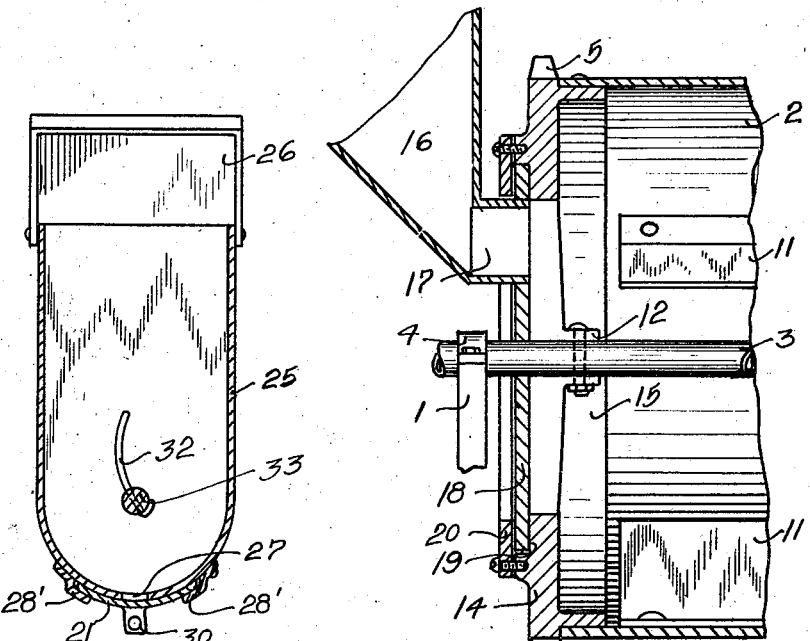
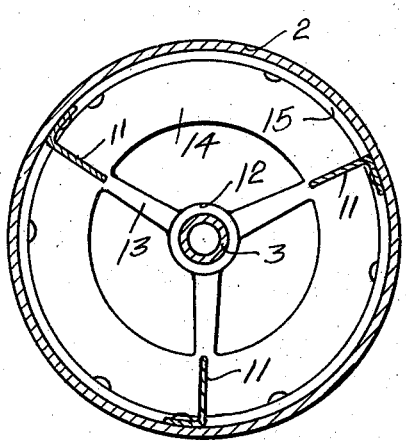
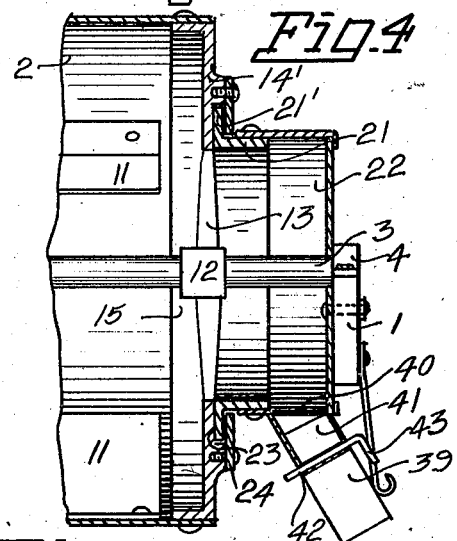
Inventor
Claude C. Calkins.
By Herbert E. Smith
Attorney Patented Feb. 8, 1927.

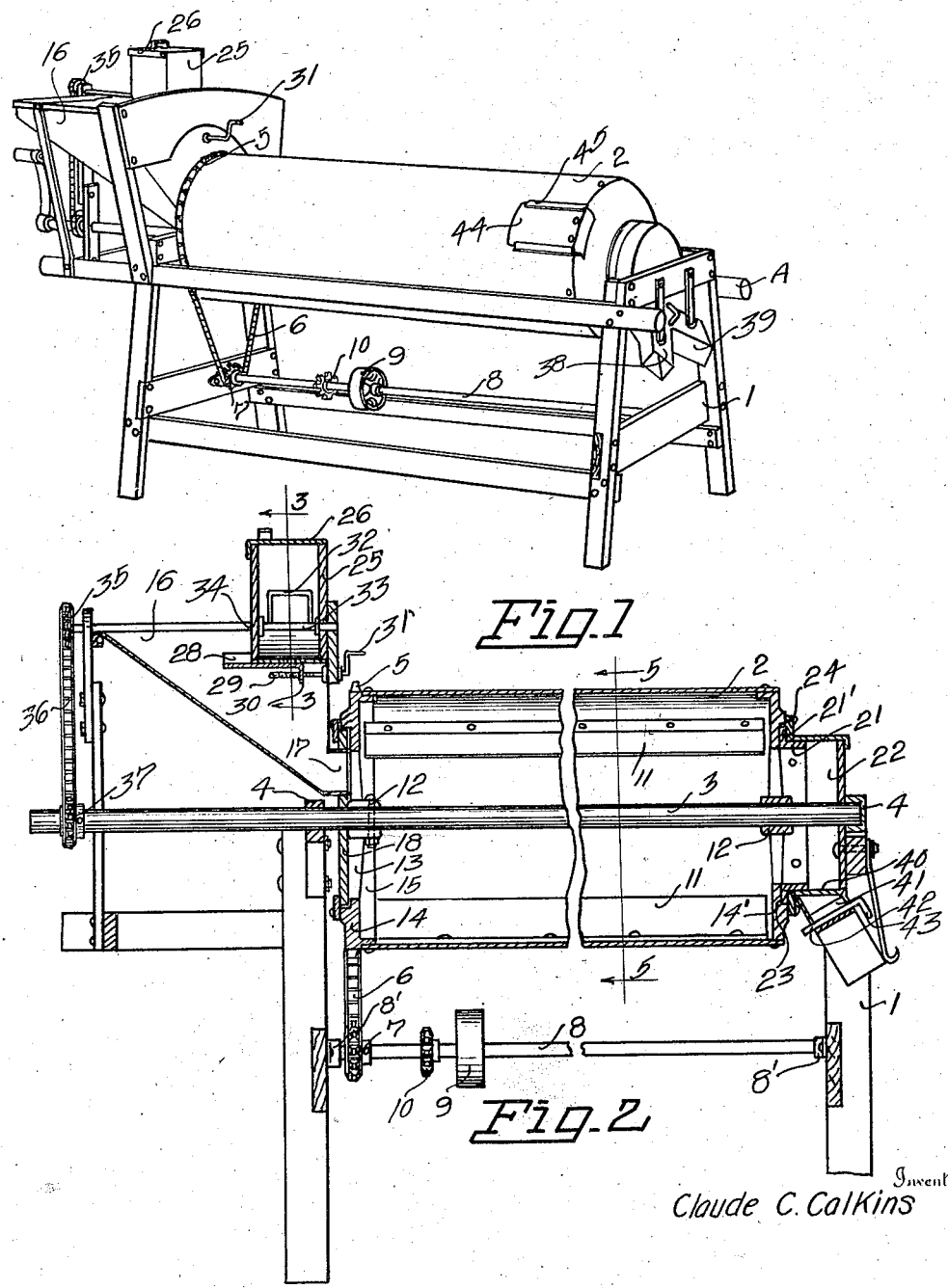

1,616,783

UNITED STATES PATENT OFFICE.

CLAUDE C. CALKINS, OF SPOKANE, WASHINGTON.

MACHINE FOR TREATING GRAIN.

Application filed August 16, 1926. Serial No. 129,613.

My present invention relates to improvements in machines for treating grain such as wheat, which treatment includes the application to the grain of a finely powdered material to form a casing or coating. The machine is equally applicable for use in treating other granular materials, but as here described and claimed is for treating seed grain, as wheat, by applying thereto a coating which will be instrumental in withstanding the attacks of disease, as smut, after the treated grain has been planted in the soil.

A dry powder is generally used as the coating material and in the treatment of wheat for the prevention of smut, copper sulphate, when used as a coating for the seed grain has been found to possess the necessary characteristics for adhering to the exterior of the grain, and such material, as is well known, is efficacious in preventing the development of smut on the seed after planting.

In the application of the powdered sulphate to the seed grain it is desirable and necessary that the grain and coating powder shall be confined in the treating vessel or receptacle during the process of treatment, to prevent waste of the powdered sulphate, and also for the purpose of preventing escape of the dust or powder to the atmosphere, which latter condition would have a deleterious effect on the air.

To fulfill these conditions I provide a sealed or closed treating apparatus utilizing a rotary drum or vessel having agitating means therein for the grain and coating material, and provided with charging and discharging means, which means are combined and arranged in such manner as to form closures or seals for the drum. The invention thus consists in certain novel features of construction and combinations and arrangements of parts as will hereinafter be more fully set forth and claimed.

In the accompanying drawings I have illustrated one complete example of the physical embodiment of my invention wherein the parts are combined and arranged in accordance with the best mode I have thus far devised for the practical application of the principles of my invention.

Figure 1 is a perspective view of a portable grain treating machine embodying my invention.

Figure 2 is a vertical, central, longitudinal sectional view of the machine of Figure 1.

Figure 3 is an enlarged sectional view at line 3—3 of Figure 2 showing the powder feeding hopper.

Figure 4 is an enlarged vertical sectional view at the inlet or charging end of the rotary drum.

Figure 5 is a transverse sectional view of the rotary drum at line 5—5 of Figure 2.

Figure 6 is an enlarged vertical sectional view at the outlet or discharge end of the rotary drum in which the seed grain and copper sulphate are mixed for coating the former.

In carrying out the preferred form of my invention as illustrated in the drawings the apparatus is utilized as a portable, power operated machine which may be driven from any suitable source of power, and the apparatus is supported on a main frame 1 which includes four handle ends A that may be utilized for carrying the apparatus to places for use.

The container in which the seed grain and coating material are mixed together for the purpose of coating the grain with such material comprises a cylindrical rotary drum 2, preferably of metal, which may be slightly inclined from its receiving end to the discharging end in order that the mixed materials may be transferred by gravity through the rotary drum. The drum is carried by and rotates with a main shaft 3 which may be hollow as shown and is journaled in suitable bearings 4. The drum is provided with an exterior sprocket wheel 5 at one end which is driven through the chain 6 and sprocket wheel 7, the latter on the driving shaft 8 that is journaled in bearings 8' in the supporting frame. Suitable power mechanism may be used to operate the machine, and such power may be applied either to the belt pulley 9 or to the driving sprocket 10 on the shaft 8.

Within the drum are provided agitators 11 which are metallic blades extending longitudinally of the interior of the drum and attached thereto for the purpose of lifting and dropping the seed grain and coating material as they pass through the drum, and in this manner the seed grain is coated with the powdered material, the latter sticking to or adhering to the surface of the seed grain as the materials are commingled. The shaft 3 extends longitudinally through the rotary drum which is secured thereto by means of the hubs 12 within the drum and near its ends, and spokes 13 radiate from these hubs to the open rings 14 and 14' which form heads for the drum at its respective ends, and the flanges 15 on these rings or heads are utilized for securing the wall of the drum, as by rivets. The heads are thus rigid with the drum, and the head 14 is utilized as the driving member for the drum, it being evident that the sprocket member 5 is fashioned thereon.

At the front or inlet end of the machine a large charging hopper 16 for seed grain is located, which hopper may be covered in usual manner and is designed to feed the seed grain through the mouth 17 to the interior of the drum. The mouth opens through a fixed, circular end plate 18, which closes the inlet end of the drum and about which plate the drum revolves or rotates with its shaft 3. To secure a closed joint between the plate and drum, the head 14 is provided with an exterior annular groove 19, and a sealing ring 20 attached to the head overlaps the joint between the head and plate to permit rotary movement of the head with relation to the plate, and prevent escape of dust or grain from the charging end of the drum.

At the outlet or discharging end of the rotary drum, the coated grain passes through a ring 21 fashioned with an annular exterior flange 21'. The discharge ring which is smaller in diameter than the drum, but complementary in size to the inner central opening of the open plate 14' forming the head in the discharge end of the drum, is firmly affixed to and supported in a hood 22 suitably supported in the main frame 1. The head 14' is grooved at 23 similarly to the grooved construction of the head 14, and a seal ring 24 is utilized to close the joint between the flange 21' and the head 14'.

In combination with the feed hopper 16 for the seed grain I utilize a smaller hopper 25 for the powdered copper sulphate, which hopper is located in the upper portion of the feed hopper and is adapted to feed the powdered material to the grain as it is being passed from its hopper to the rotary drum. The hopper 25 is provided with a lid 26 hinged thereto in suitable manner, and in its rounded bottom an opening or discharge mouth 27 is arranged vertically thereof. The size of this opening and the discharge of powder therethrough is governed by an adjustable slide or bottom plate 28 retained and guided in a pair of opposed, grooved, guide plates 28' secured at the underside of the bottom of the hopper. An adjusting screw 29 is journaled in a suitable bearing and passes through a non-rotatable nut or lug 30 depending from the slide plate 28. The screw bar is fashioned with a crank handle 31 by means of which it may be turned to slide the plate and regulate the size of the mouth in the hopper and control the feed of the powdered copper sulphate to the grain as it is fed to the drum.

To prevent packing of the powder in the lower end of the hopper 25 and to insure its feed through the discharge mouth 27, I utilize a stirrer 32, which is a U-shaped yoke carried on the shaft 33 that projects through the hopper and is journaled in bearings 34. The stirrer passes through the powdered material in the hopper, and its shaft 33 is revolved by means of a sprocket wheel 35, sprocket chain 36, and sprocket wheel 37, the latter on the drum shaft 3. The seed grain as it is fed by gravity to the rotating drum is supplied with powdered copper sulphate from the hopper 25, and these two materials in proper proportions, pass into the interior of the drum. The continuous rotary movement of the drum and the action of the agitator blades within the drum cause a close and intimate intermingling of the powder with the grain for coating the latter, and the inclination given to the apparatus by a slight elevation of the discharging end causes the materials to gradually pass toward the delivery or discharge end of the drum.

To insure the proper treatment of the grain it is retained in the drum until the quantity therein rises from the bottom of the drum to the level of the discharge ring 21, and the head 14' acts as a barrier against discharge of the grain until this level is reached. After the level has been reached it is maintained by a continuous feed of the grain and powder, and the treated grain is poured over the discharge ring and through the outlet in the hood in a comparatively thin stream.

Two outlet or discharge spouts 38 and 39 are shown at the discharge end of the drum and connected with the hood 22, and from these spouts the treated grain may be conveyed to the waiting receptacles or bags. As the grain passes out through the opening 40 at the bottom of the hood, it is directed or deflected to either of the spouts by a gate 41, pivoted at 42 below the opening and provided with a handle 43 by means of which it is turned to direct the flow of the coated grain.

For emptying or cleaning out the drum a trap door or slide plate 44 is provided to normally close an opening in the wall of the rotary drum, and this plate is retained and guided in the spaced, parallel, grooved plates 45 attached at the exterior of the drum and near one end. By sliding the plate to uncover the opening provision is made for emptying the contents of the drum through the uncovered opening.

From the above description taken in connection with my drawings, it will be apparent that I have provided an apparatus by means of which the grain may be coated for the purpose desired, which apparatus is efficient in the performance of its functions, simple in construction and operation, and comparatively inexpensive in cost of production and operation.

Having thus fully described my invention, what I claim as new and desire to secure by Letters Patent is—

1. The combination of a rotary drum having transverse material-retaining heads at its opposite ends and center openings therein, a shaft and means for fixing said heads on the shaft, a stationary circular plate located and co-acting in an annular groove on one of said heads and an inlet opening in said plate, and a sealing ring attached to said head and overlapping the joint between said plate and grooved head.

2. The combination of a rotary drum having transverse material-retaining heads at its ends and center openings therein, a driven sprocket member on one of said heads, a closure having a feed opening at one end of said drum and means co-acting with said closure and an adjacent head for sealing the joint between said closure and head, a discharge hood adjacent the other head, a discharge ring fixed to said hood and means co-acting with said discharge ring and head for sealing the joint between said head and ring.

3. The combination in a grain treating machine with feeding and delivery devices, of a rotary drum and agitators therein, open-center heads closing the ends of the drum and forming concentric end walls therefor, stationary means closing the open-center heads of the drums, and means on the drum for sealing the joints between said heads and stationary closing means.

4. The combination with a rotary drum having an exteriorly grooved, open-center head forming an end wall for said drum, of a stationary hood, a discharge ring fixed to the hood, an annular flange on said ring located in the grooved head, and a sealing ring attached to said head and overlapping the flange.

5. The combination in a grain treating machine, of a rotary drum having a shaft and open-center heads for said drum fixed to the shaft, of a closure for said open-center heads, one of said closures comprising a stationary circular plate and a sealing ring carried by said drum for said plate and head, the other closure including a stationary flanged ring and sealing ring carried by the drum for said latter ring and a head.

6. The combination in a grain treating machine, of a rotary shaft and drum and open-center heads for said drum fixed to the shaft, of closures for said heads, one of said closures comprising a stationary circular plate and a sealing ring carried by the drum for said plate and head, the other closure including a stationary flanged discharge ring and a sealing ring carried by the drum for said discharge ring and a head.

In testimony whereof I affix my signature.

CLAUDE C. CALKINS.